United States Patent
Truyen

(10) Patent No.: US 7,421,100 B2
(45) Date of Patent: Sep. 2, 2008

(54) METHOD, COMPUTER PROGRAM AND SYSTEM OF VISUALIZING IMAGE DATA

(75) Inventor: Roel Truyen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 729 days.

(21) Appl. No.: 10/512,118

(22) PCT Filed: Apr. 25, 2003

(86) PCT No.: PCT/IB03/01573

§ 371 (c)(1),
(2), (4) Date: Oct. 21, 2004

(87) PCT Pub. No.: WO03/091950

PCT Pub. Date: Nov. 6, 2003

(65) Prior Publication Data

US 2005/0168474 A1    Aug. 4, 2005

(30) Foreign Application Priority Data

Apr. 26, 2002    (EP) .................................. 02076671

(51) Int. Cl.
*G06K 9/00*    (2006.01)

(52) U.S. Cl. ...................................... 382/128; 345/581

(58) Field of Classification Search .................. 382/128, 382/129, 130, 131, 132, 133, 134; 378/4, 378/21, 23, 24, 25, 26, 27, 46, 63, 90, 92, 378/98.4, 98.6, 98.9, 101, 140; 600/407, 600/410, 425; 424/9.3

See application file for complete search history.

(56) References Cited

U.S. PATENT DOCUMENTS

| | | | | |
|---|---|---|---|---|
| 5,986,662 A | * | 11/1999 | Argiro et al. | 345/424 |
| 6,154,516 A | * | 11/2000 | Heuscher et al. | 378/15 |
| 6,580,937 B2 | * | 6/2003 | Ho et al. | 600/415 |
| 6,629,937 B2 | * | 10/2003 | Watrous | 600/586 |
| 6,650,729 B2 | * | 11/2003 | Braess et al. | 378/108 |

* cited by examiner

*Primary Examiner*—Abolfazl Tabatabai

(57) ABSTRACT

The invention relates to a method of visualizing image data relating to an examination of a subject. The method concerns automatic selection of appropriate protocols from a set of predefined protocols defining visualizing techniques to be applied to the image data in a first step (10) the image data are analyzed for content. In a second step (20) based on the analysis a decision is made regarding the part of the subject's anatomy represented by the image data and/or the purpose of the examination performed on the subject. Finally in the third step (30) one or more of the appropriate protocols are selected in dependence of the anatomy part present and/or the purpose of the examination performed. The invention also refers to a computer program and a system to carry out the method according to the invention.

11 Claims, 1 Drawing Sheet

METHOD, COMPUTER PROGRAM AND SYSTEM OF VISUALIZING IMAGE DATA

Figure 1:
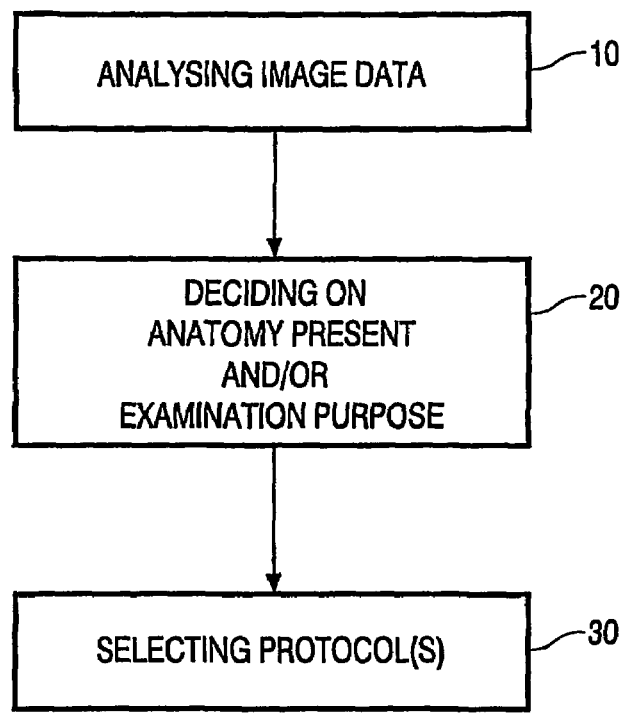

The present invention relates to a method of visualizing image data relating to an examination of a subject, comprising the step of automatically selecting one or more appropriate protocols from a set of predefined protocols defining visualizing techniques to be applied to the image data.

An image data of a subject, notably a (human) patient, can be acquired by various examination techniques, such as X-ay techniques, Magnetic Resonance-techniques, Computed Tomography techniques or ultrasound techniques. After acquisition the image data need to be presented in an appropriate way to suitably skilled personnel for review.

A method of the type as described above is known from U.S. Pat. No. 5,986,662. According to the known method an appropriate display protocol is selected based on attribute data that accompany the image data. Attribute data may comprise the name of the examination technique performed that needs to be filled in by the user or may be filled in automatically when scanning the patient. Other attribute data comprise the number and resolution of the images and the modality used.

The known method has the disadvantage that the attribute data to be filled in are often not filled in completely. Moreover there is no accepted standard to describe each examination. The other attribute data mentioned are usually not sufficient to decide on the nature of the examination. In case the nature of the examination is unsure default display techniques may be applied to the image data resulting in a sub-optimal presentation. In order to enhance the presentation the user will have to perform a manual selection of the appropriate protocol, which can be a real burden, especially for the less experienced user.

It is an object of the method according to the invention to provide a method of the type as described above that overcomes this disadvantage.

The method according to the invention is therefore characterized in that the method further comprises the steps of: b) analyzing the image data; c) deciding on the part of the subject's anatomy represented by the image data; and/or d) deciding on the purpose of said examination performed on the subject; and e) selecting one or more of the appropriate protocols in dependence of the anatomy part present and/or the purpose of the examination performed. Preferably, at the step of analyzing the image data the image content is analyzed. Still preferably, the image content is analyzed by means of a suitable pixel-based approach. Examples of the suitable pixel-based approach comprise constructing global or local greyvalue histograms in the image and comparing them with prestored template images with known image content and their histograms. Also, it is possible to construct suitable distribution of features, like edge strengths, texture, noise structure in the image and to compare them to a template image with known features. It is further possible to extract salient structures, like bones, contrasted vessels, air filled structures, like colon or trachea. It is still further possible to carry out an extraction of main shapes and their size in the images under investigation. It is still further possible to carry-out a rough fully automated segmentation of the image under investigation to decide on the structures present in the image. By analyzing the content of the image data an appropriate protocol can always be selected without intervention with the user. The method according to the invention thus allows for a more automated and flexible workflow for purposes of post-processing of image data.

In a first preferred embodiment step e) comprises the step of: e1) selecting one or more appropriate protocols from a set of predefined protocols, a number of said predefined protocols defining processing techniques to be applied to the image data. Advantageously herein also suitable processing techniques are automatically applied to the image data ensuring an optimal presentation of the image data to the user and a further automated workflow.

According to a second preferred embodiment of the method according to the invention step e) comprises the step of: e2) automatically selecting one or more appropriate protocols from a set of predefined protocols, a number said predefined protocols defining techniques for Computer Aided Diagnosis (CAD) to be applied to the image data. When starting the necessary CAD techniques automatically the workflow is even further automated. Since CAD techniques are usually time consuming this shortening of the start-up time allows for a quicker review of the image data.

According to a third preferred embodiment the method according to the invention step e) comprises the step of: e3) selecting one or more appropriate protocols from a set of predefined protocols, a number of said predefined protocols defining anatomy dedicated techniques to be applied to the image data. The workflow is now successfully automated even further by automatic selection of so called "dedicated tools" that are developed for visualizing specific parts of the human anatomy and are known per se in the relevant field.

Preferably step e) of the method according to the invention further comprises the step of: e4) automatically selecting one or more appropriate protocols from a set of predefined protocols, a number said predefined protocols defining display techniques to be applied to the image data. The choice of a suitable display technique is now automatically made and the image data are presented in a correct view to the user.

In another preferred embodiment step b) comprises the step of comparing the image data to reference data. By using reference images the analysis of the image content can be conducted in a reliable and quick manner. An example of suitable reference data is a template image with a known content. Preferably, the template image is prestored and is made available, for example by retrieving it from a database of template images.

In further preferred embodiment step b) comprises the step of subdividing the image data in coherent parts. Preferably, this step is carried out based on an expert knowledge. Introducing expert knowledge in the analysis, for example by means of a suitable subroutine implemented in a computer, advantageously results in an even more reliable outcome.

According to yet a further preferred embodiment step b) comprises the step of extracting salient structures present in the image data. Extracting and defining salient structures of the human anatomy, like bones, contrasted vessel, air filled colon, etc, is of great value in the analyzing step. It is also an important preparation for step c) defining the anatomy present in the image data and for step d) deciding on the purpose of the examination performed on the subject.

The invention also refers to a computer program to carry out the method according to the invention.

The invention also concerns a system to carry out the method according to the invention, comprising: means for automatically selecting one or more appropriate protocols from a set of predefined protocols defining visualizing techniques to be applied to the image data. The system is characterized in that it further comprises: b) means for analyzing the image data; c) means for deciding on the part of the subject's anatomy represented by the image data; and/or d) means for deciding on the purpose of the examination performed on the subject; and e) means for selecting the appropriate protocol in dependence of the anatomy part present and/or the purpose of the examination performed.

Figure 2:
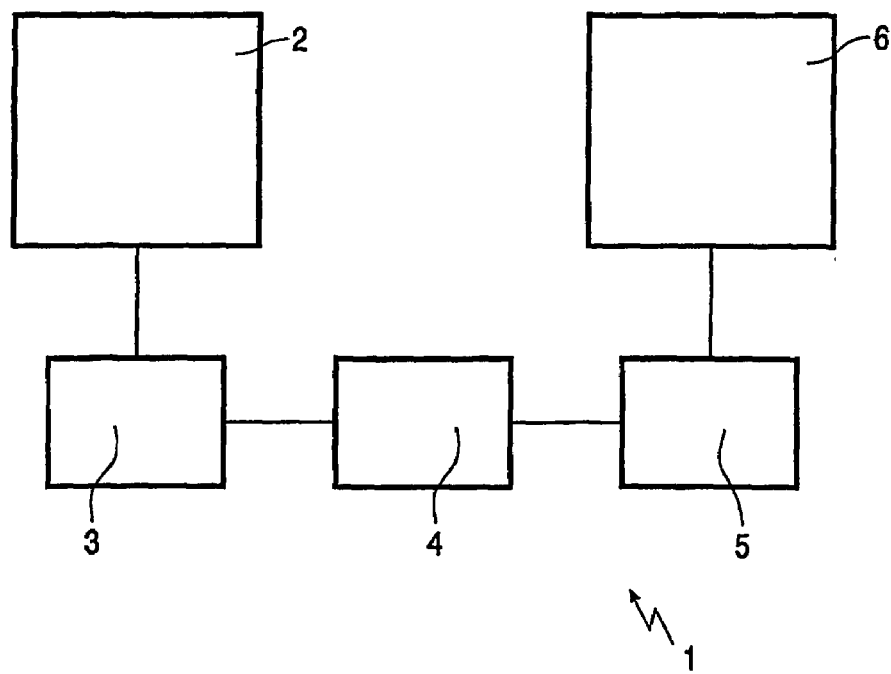

The invention will be further explained by means of the attached drawings, in which:

FIG. 1 shows a diagram illustrating the main steps of the method according to the invention; and FIG. 2 schematically shows the main components of a system to carry out the method according to the invention.

In general the method according to the invention refers to a method of visualizing anatomical image data relating to a subject. FIG. 1 shows a diagram illustrating the main steps 10, 20 and 30 of the method according to the invention that will now be discussed in detail.

Step 10: Analyzing the Image Data:

In this step the content of the image data is analyzed. Many analyzing techniques are known per se in the art and can be used in step 10. In the following a number of them will be discussed that are believed to be especially useful.

As a first example of an analyzing technique the global or local gray value histograms in the image can be determined. Another example would be to asses the distribution of features in the image data. Various features can be looked at, such as transitions, edge strengths, texture, noise structure etc.

As another example of an analyzing technique salient structures present in the image data can be extracted. Salient structures typically comprise anatomic landmarks, such as sharp edges and strong transitions. Extraction of main shapes and their sizes may also be useful.

The analysis of the image data may further comprise the step of comparing the image data to reference data comprised in a database. Suitable reference data typically comprise image data of which the content is known. Furthermore or as an alternative the analysis of the image data may comprise the step of subdividing the image data in coherent parts on the basis of expert knowledge. Expert knowledge can for instance be introduced by using predetermined threshold data values, e.g. based on Hounsfield values, e.g. for CT exams, relating to transitions in the image data, such as the transition from air to soft tissue.

Step 20: Deciding on Anatomy Present and/or Examination Purpose:

Based on the outcome of the analysis in this step a decision should be made regarding the content of the image data, either regarding the anatomy that is most likely incorporated in the image data or the purpose of the examination performed, or both.

In the field of computer science decisions are generally taken by defining a decision tree and walking through it. In such a decision tree a number of relevant questions is defined. Different combinations of positively answered question will lead to different outcomes. As will be apparent the number of possible outcomes may in one embodiment correspond to the number of anatomy parts of the human body, which is too large to cover in detail in this application. As an illustration therefore a limited number of combinations leading to definition of specific anatomy parts is discussed below.

IF image content=vertebras
    AND image content=two large volumes of air
    THEN anatomy=thorax
    IF image content=vertebras
    AND image content=tube like structure with air
    THEN anatomy=abdomen AND examination purpose=colon
    IF image content=(half)round shape
    AND image content=small tube like structures
    THEN anatomy=head AND examination purpose=vascular study In case additional data are available, for instance in the form of attributes, such as examination technique or number of images recorded, then these can be used in the decision making step, as illustrated in the following step.

IF examination technique=MR
    AND number of images=large
    AND time series=short
    AND image content=two concentric circles
    AND size of two concentric circles=constant
    THEN anatomy=heart AND exam=perfusion
    IF examination technique=MR
    AND number of images=large
    AND time series=short
    AND image content=two concentric circles
    AND size of two concentric circles=variable
    THEN anatomy=heart AND examination purpose=functional analysis Step 30: selecting the appropriate protocol:

Based on the anatomy decided to be present or on the decided purpose of the examination performed or on the combination thereof, in this step the appropriate protocol should be selected. A protocol may comprise display techniques or processing techniques or CAD techniques or dedicated tools, or any combination thereof. Typically the protocols are present as software applications that can be applied to the image data in order to provide the user automatically with a correct view of the image data. The protocols can preferably be configured by the user so as to incorporate preferred tools, viewing and/or processing techniques for each type of examination. A number of protocols are discussed in more detail below.

Type of Protocol:

The set of predefined protocols will preferably include a number of display protocols defining display techniques to be applied to the image data. Some examples of useful display techniques comprise: reformats (slice of data), Maximum Intensity Projection (MIP), volume rendering techniques, surface rendering techniques. All of these display techniques are known per se in the relevant field.

The set of predefined protocols will preferably include a number of processing protocols defining processing techniques to be applied to the image data. Some examples of useful display techniques are mentioned below, all of which are known per se to a person skilled in the art.

Background processing, e.g. defining background pixels and assigning suitable values thereto;
    Path tracking, e.g. for defining the center of or the centerline through apart of the subject's anatomy, such as a vessel or a colon;
    Segmentation of (part of) the anatomy, such as bone, optionally followed by removal of one or more segments, f.i. bone removal;
    Measurements of anatomy parts, such as measuring the diameter of a vessel, the size of a polyp, or the volume of the left ventricle.

The set of predefined protocols may preferably include a number of CAD protocols defining techniques for Computer Aided Diagnosis (CAD) to be applied to the image data.

Some examples known per se relate to the search for abnormalities, such as aneurysms, colorectal polyps, tumors, lung nodules, abnormalities in a mammography.

The set of predefined protocols may preferably further include a number of dedicated protocols defining anatomy dedicated techniques, also known in the art as "dedicated tools", to be applied to the image data Some examples of dedicated tools are: virtual endoscopy tool (Endo-3d tool), heart inspection tool (Cardiac analysis tool), vessel inspection tool (vessel analysis tool), lung nodule detection tool and lung nodule evaluation tool, etc.

Selection of a Protocol:

The selection of a protocol can be realized by a simplified decision tree, as illustrated by the following examples.

IF anatomy=thorax
    THEN display protocol=Digital Reconstructed Radiograph (DRR)
    AND CAD protocol=lung nodule detection tool
    IF anatomy=head
    THEN display protocol=three orthogonal views
    AND display protocol=reformats
    IF examination purpose=colon
    THEN dedicated protocol=Virtual Endoscopy (VE)
    AND processing protocol=path tracking
    AND CAD protocol=polyp detection
    IF anatomy=head AND examination purpose=vessels
    THEN display protocol=Maximum Intensity Projection (NIP)
    AND processing protocol=path tracking
    AND processing protocol=bone removal
    IF anatomy=heart
    THEN display protocol=reformats For illustration purposes two examples of the method according to the invention are given below.

EXAMPLE A

A CT data volume is loaded (this information is assumed to be present in the image attributes).

In the analyzing step bony structures like spine and pelvis can easily be isolated by means of gray value thresholding. After use of a rough structure recognizer the decision can be taken that a spine and pelvis are present in the image data (at least partially). Based on the available information the decision can be taken that the anatomy present is the abdomen, and only CT abdominal related protocols are selected.

a) If an elongated, air-filled structure of a certain diameter is decided to be present, it can be decided that the purpose of the examination was colon and the patient was prepared for virtual colonoscopy. An appropriate protocol to be selected could comprise a dedicated tool, in this case an endo tool, as well as a CAD tool, in this case automatic polyp detection, as well as a processing tool, such as path tracking.

b) If blood vessels filled with contrast medium are decided to be present, an appropriate protocol to be selected could comprise a dedicated tool, in this case a vessel analysis tool, as well as a processing tool, such as path tracking.

c) If a contrasted aorta is decided to be present, an appropriate protocol to be selected could comprise a processing protocol for measuring the aorta automatically, and a dedicated tool can be started, for instance a CAD protocol in search of an aneurysm.

EXAMPLE B

An X-ray image is loaded (this information is assumed to be present in the image attributes).

a) After use of a dedicated chest finder the decision can be taken that the anatomy present is the thorax. Only X-ray chest related protocols are selected. An appropriate protocol to be selected could comprise processing tools, such as enhancement filters, as well as a CAD tool, in this case an automatic lung nodule detector.

b) The content analysis may point out that the anatomy present in the image data is the knee and the purpose of the examination is an orthopedic study. An appropriate protocol could comprise a processing protocol for taking measurements of the knee, for instance for knee prosthesis planning.

Now the method of the invention is explained a skilled person will be able to translate the steps of the method into a computer program to carry out the method.

FIG. 2 schematically shows the main components of a system 1 that is arranged to carry out the steps of the method according to the invention. System 1 comprises an image data acquisition system 2. Many types of acquisition systems for acquiring anatomical image data are available in the relevant field, among which are Computed Tomography systems, MR systems, X-ray systems, etc. All of these can form part of system 1.

System 1 further comprises an image display system 6. Many types of suitable display systems are available in the field, such as a personal computer, optionally functioning as a PACS station.

According to the invention system 1 further comprises means 3, 4 and 5 communicating with image data acquisition system 2 and image display system 6. Means 3 are arranged for analyzing the image data. Means 4 are arranged for deciding on the part of the subject's anatomy that is represented by the image data and/or the purpose of the examination performed on the subject. Means 5 are arranged for selecting the appropriate protocol in dependence of the anatomy part present or the purpose of the examination performed.

Now the method of the invention is explained in detail a skilled person will be able to arrange means 3, 4 and 5, such that they are able to carry out the steps of the method. All necessary means and techniques to accomplish this task are available per se to a person of ordinary skill in the art, either in software or in hardware. Means 3 require the most computational power and are therefore preferably coupled to a computer with high computational power, such as a workstation.

It is noted that means 3, 4 and 5 are drawn as separate units. It will however be clear to any person skilled in the art that means 3, 4 and 5 can also be combined into one or two units. As an alternative one or more of the units can be incorporated into image data acquisition system 2 or into the image display system 6. Means 4 and 5 could for example be incorporated into means 3 as well as into image display system 6.

The invention is of course not limited to the described or shown embodiment, but generally extends to any embodiment, which falls within the scope of the appended claims as seen in light of the foregoing description and drawings.

The invention claimed is:

1. A method of visualizing image data relating to medical examination of a subject, comprising the acts of:
   a) automatically selecting one or more appropriate protocols from a set of predefined protocols defining visualizing techniques to be applied to the image data, wherein the method further comprises the steps of:
   b) automatically analyzing the image data without user intervention;
   c) deciding on the part of the subject's anatomy represented by the image data based on results of the analysis of the image data; and/or
   d) deciding on the purpose of the medical examination performed on the subject based on results of the analysis of the image data; and e) automatically selecting one or more of the appropriate protocols in dependence of the anatomy part present and/or the purpose of the examination performed.

2. The method according to claim 1, wherein act e) comprises the act of:
   e1) selecting one or more appropriate protocols from a set of predefined protocols, a number of said predefined protocols defining processing techniques to be applied to the image data.

3. The method according to claim 1, wherein act e) comprises the act of:
   e2) selecting one or more appropriate protocols from a set of predefined protocols, a number said predefined protocols defining techniques for Computer Aided Diagnosis (CAD) to be applied to the image data.

4. The method according to claim 1, wherein act e) comprises the act of:
   e3) automatically selecting one or more appropriate protocols from a set of predefined protocols, a number said predefined protocols defining anatomy dedicated techniques to be applied to the image data.

5. The method according to claim 1, wherein act e) comprises the act of:
   e4) automatically selecting one or more appropriate protocols from a set of predefined protocols, a number said predefined protocols defining display techniques to be applied to the image data.

6. The method according to claim 1, wherein act b) comprises the act of automatically comparing the image data to reference data.

7. The method according to claim 1, wherein act b) comprises the act of automatically subdividing the image data in coherent parts on the basis of expert knowledge.

8. The method according to claim 1, wherein act b) comprises the act of automatically extracting salient structures present in the image data.

9. A computer-readable medium encoded with a computer program to carry out the method according to claim 1.

10. A system of visualizing image data relating to medical examination of a subject, the system comprising:
    a) means for automatically selecting one or more appropriate protocols from a set of predefined protocols defining visualizing techniques to be applied to the image data, wherein the system further comprises:
    b) means for automatically analyzing the image data;
    c) means for deciding on the part of the subject's anatomy represented by the image data based on results of the analysis of the image data; and/or
    d) means for deciding on the purpose of the medical examination performed on the subject based on results of the analysis of the image data; and
    e) means for automatically selecting the appropriate protocol in dependence of the anatomy part present and/or the purpose of the medical examination performed.

11. A system of visualizing image data relating to medical examination of a subject, the system comprising:
    a portion configured to automatically analyze the image data;
    a portion configured to decide on the part of the subject's anatomy represented by the image data based on results of the analysis of the image data; and/or
    a portion configured to decide on the purpose of the medical examination performed on the subject based on results of the analysis of the image data; and
    a portion configured to select one or more appropriate protocols from a set of predefined protocols defining visualizing techniques to be applied to the image data in dependence of the anatomy part present and/or the purpose of the medical examination performed.

* * * * *